US008688283B2

(12) United States Patent
Ganev et al.

(10) Patent No.: US 8,688,283 B2
(45) Date of Patent: Apr. 1, 2014

(54) METHOD AND SYSTEM FOR POWER QUALITY PROTECTION

(75) Inventors: Evgeni Ganev, Torrance, CA (US); Cuong Nguyen, Redondo Beach, CA (US); William Warr, Glendale, CA (US)

(73) Assignee: Honeywell International Inc., Morristown, NJ (US)

( * ) Notice: Subject to any disclaimer, the term of this patent is extended or adjusted under 35 U.S.C. 154(b) by 530 days.

(21) Appl. No.: 12/985,120

(22) Filed: Jan. 5, 2011

(65) Prior Publication Data

US 2012/0016531 A1 Jan. 19, 2012

Related U.S. Application Data

(60) Provisional application No. 61/365,236, filed on Jul. 16, 2010.

(51) Int. Cl.
*G06F 1/28* (2006.01)
(52) U.S. Cl.
USPC .............................................. 700/293; 361/79
(58) Field of Classification Search
None
See application file for complete search history.

(56) References Cited

U.S. PATENT DOCUMENTS

| 5,831,807 | A | * | 11/1998 | Masannek et al. | 361/93.2 |
| 5,936,817 | A | * | 8/1999 | Matsko et al. | 361/72 |
| 5,940,257 | A | * | 8/1999 | Zavis | 361/42 |
| 2001/0008541 | A1 | * | 7/2001 | Andersen | 374/45 |
| 2001/0019573 | A1 | * | 9/2001 | Dougherty et al. | 374/4 |
| 2002/0093774 | A1 | * | 7/2002 | Chung | 361/2 |
| 2005/0122642 | A1 | * | 6/2005 | Plemmons et al. | 361/23 |
| 2007/0030606 | A1 | * | 2/2007 | Ganev et al. | 361/23 |

FOREIGN PATENT DOCUMENTS

| JP | 58050476 A | 3/1983 |
| WO | WO 2010 014302 A1 | 2/2010 |

OTHER PUBLICATIONS

Duarte, S.X. and Kagan, N., "A Power-Quality Index to Assess the Impact of Voltage Harmonic Distortions and Unbalance to Three-Phase Induction Motors", IEEE Transactions on Power Delivery, vol. 25, No. 3, Jul. 2010vol. 25 Issue:3 on pp. 1846-1854.

* cited by examiner

*Primary Examiner* — Rexford Barnie
*Assistant Examiner* — Angela Brooks
(74) *Attorney, Agent, or Firm* — Shimokaji & Associates P.C.

(57) ABSTRACT

A method for power quality protection includes measurement of electrical and nonelectrical parameters, calculation of additional electrical and nonelectrical parameters, comparison of the value of the calculated parameters with maximum allowed values from a power quality perspective, activation of protection mechanisms for transitioning to a safe mode or for isolation from the bus. The systems and methods may prevent equipment failures when out of the spec power quality is present in the distribution bus and may protect the distribution bus from imposing power quality problems due to equipment failures. Because most of the sensors in the systems of the present invention are already used for other control and protection purposes, there may be no reliability degradation. Most of the calculations and the control logic may be performed digitally for improved reliability and flexibility to modify algorithms.

20 Claims, 2 Drawing Sheets

METHOD AND SYSTEM FOR POWER QUALITY PROTECTION

CROSS-REFERENCE TO RELATED APPLICATIONS

This application claims the benefit of priority to U.S. Provisional patent application No. 61/365,236, filed Jul. 16, 2010, which is herein incorporated by reference.

BACKGROUND OF THE INVENTION

The present invention relates to the field of power electronics and, more particularly, to methods and systems for electric power quality protection.

Power quality plays a significant role in the modern aerospace/military industry. This is particularly true in the area of more electric architecture (MEA) for aircraft and spacecraft.

The commercial aircraft business is moving toward having electrical no-bleed-air environmental control systems (ECS), electrical variable-frequency (VF) power distribution systems, and electrical actuation. A typical example is the present Boeing 787 platform. Also, the Airbus A350 airplane will incorporate a large number of MEA elements. In the future, the next-generation Boeing airplane (replacement for the 737) and the next-generation Airbus airplane (replacement for the A320) will most likely use MEA. Some military aircraft already utilize MEA for primary and secondary flight control, among other functions.

Military ground vehicles have migrated toward hybrid electric technology, where the main propulsion is performed by electric drives. Therefore, a substantial demand for increased power electronics in these areas has emerged.

Future space vehicles will require electric-power-generation systems for thrust vector and flight control actuation. These systems must be more robust and offer greatly reduced operating costs and safety compared with many of the existing Space Shuttle power systems.

These new MEA aerospace and military trends have significantly increased the installed electrical sources and loads, along with the challenges to accommodate electrical equipment to new platforms. This has led to increased operating voltages and efforts to reduce system losses, weight, and volume. A new set of electrical power quality requirements has been created to satisfy system performance. Traditionally, the sources (electric generators) are required to maintain certain power quality requirements and their loads are to be able to operate at these requirements. Also, the loads are required to not create power quality disturbances on the distribution buses above certain levels. Yet the probability of power quality issues has increased due to the large number of installed electric equipment and their complex interactions.

Power quality is required to allow for compatibility between sources and loads installed on the same power distribution bus. A typical aircraft electric power system consists of a main power source, an emergency power source, power conversion equipment, control/protection equipment, and an interconnect network (i.e. wires, cables and connectors). The main power source comprises the main generators, driven by the aircraft propulsion engines. Emergency power is extracted from aircraft batteries, aircraft independent auxiliary power units (APUs), and aircraft ram air or hydraulically driven generators.

Power quality requirements for AC electrical equipment consist of a large number of parameters. Some of these parameters include current distortion, inrush current, voltage distortion, voltage modulation, power factor, phase balance and DC content. Current distortion, composed of AC harmonics, is the key design driver for electrical equipment. The requirements for current harmonics, subharmonics, and interharmonics specify the allowable distortion as a function of multiples of the fundamental frequency of the equipment input voltage.

A typical AC current harmonic includes all odd harmonics up to 39, with limits ranging from 10 to 0.25 percent of the maximum current fundamental. The current distortion requirement is a key design driver since it usually significantly impacts the equipment weight. Current distortion also is specified as a function of the equipment-rated power because higher power equipment has more influence on the power bus. Widely used specifications for power quality are MIL-STD-704-A to F, Airbus ABD0100, and Boeing TBD.

Power quality is a major concern for MEA aircraft because a large number of electric power systems and equipment are installed on the same electrical bus. The power quality of these systems and equipment has stringent requirements to ensure that all power supplies/utilization equipment function properly together.

For power supply equipment additional monitoring features are implemented to detect and isolate equipment, or groups of equipment, that may experience a power quality issue. This isolation capability is to protect other operating power supplies and utilization equipment. For power utilization equipment, strict power quality requirements are imposed. Some reasons for the requirements are as follows: (a) equipment contributing to power quality problems causes other equipment to fail; (b) equipment is prevented from achieving its design performance or reliability due to the reduced power quality of the source; (c) perhaps to meet a desired minimum weight, equipment designed with no power margin tends to be more susceptible to power quality issues; and (d) equipment designed to minimize weight tends to create power quality issues.

In the existing state-of-the-art power system, the power utilization equipment does not have power quality protection, or it is limited to over-voltage and under-voltage protections only. There are scenarios where a single equipment failure may propagate and create bus power quality non-compliance, leading to potential additional failures. For example, a single power source failure could fail to isolate power quality deficiencies and may damage utilization equipment or other power sources. A single utilization equipment failure may create non-compliant power quality bus and lead to other utilization equipment failure and/or power source failure. Utilization equipment can experience a destructive failure due to its own power quality non-compliance, and utilization equipment may fail regardless of the source of the power quality non-compliance on the bus.

As can be seen, there is a need for improved power quality protection of power utilization equipment.

SUMMARY OF THE INVENTION

In one aspect of the present invention, a power quality protection system comprises an input for an AC power signal; circuit breakers on each leg of the AC power signal; a plurality of sensors for measuring electrical and non-electrical parameters; and control and processing logic programmed with code for calculating additional electrical and non-electrical parameters, comparing the values of the calculated parameters with maximum allow values, and activating a protection mechanism.

In another aspect of the present invention, a power quality protection method comprises measuring electrical and nonelectrical parameters of an electric drive system; calculating additional electrical and non-electrical parameters; comparing the values of the calculated parameters with maximum allowed values; and activating a protection mechanism for transitioning to a safe mode or for isolation of the electric drive system from a power bus.

In a further aspect of the present invention, a digital processor-readable medium containing programmable code for implementing a method, the method comprises sensing electrical and non-electrical parameters of an electric drive system; calculating additional electrical and non-electrical parameters; comparing the values of the calculated parameters with maximum allowed values; and activating a protection mechanism for transitioning to a safe mode or for isolation of the electric drive system from a power bus, wherein at least one of the calculated parameters include high-frequency harmonics.

These and other features, aspects and advantages of the present invention will become better understood with reference to the following drawings, description and claims.

DETAILED DESCRIPTION OF THE INVENTION

Figure 1:
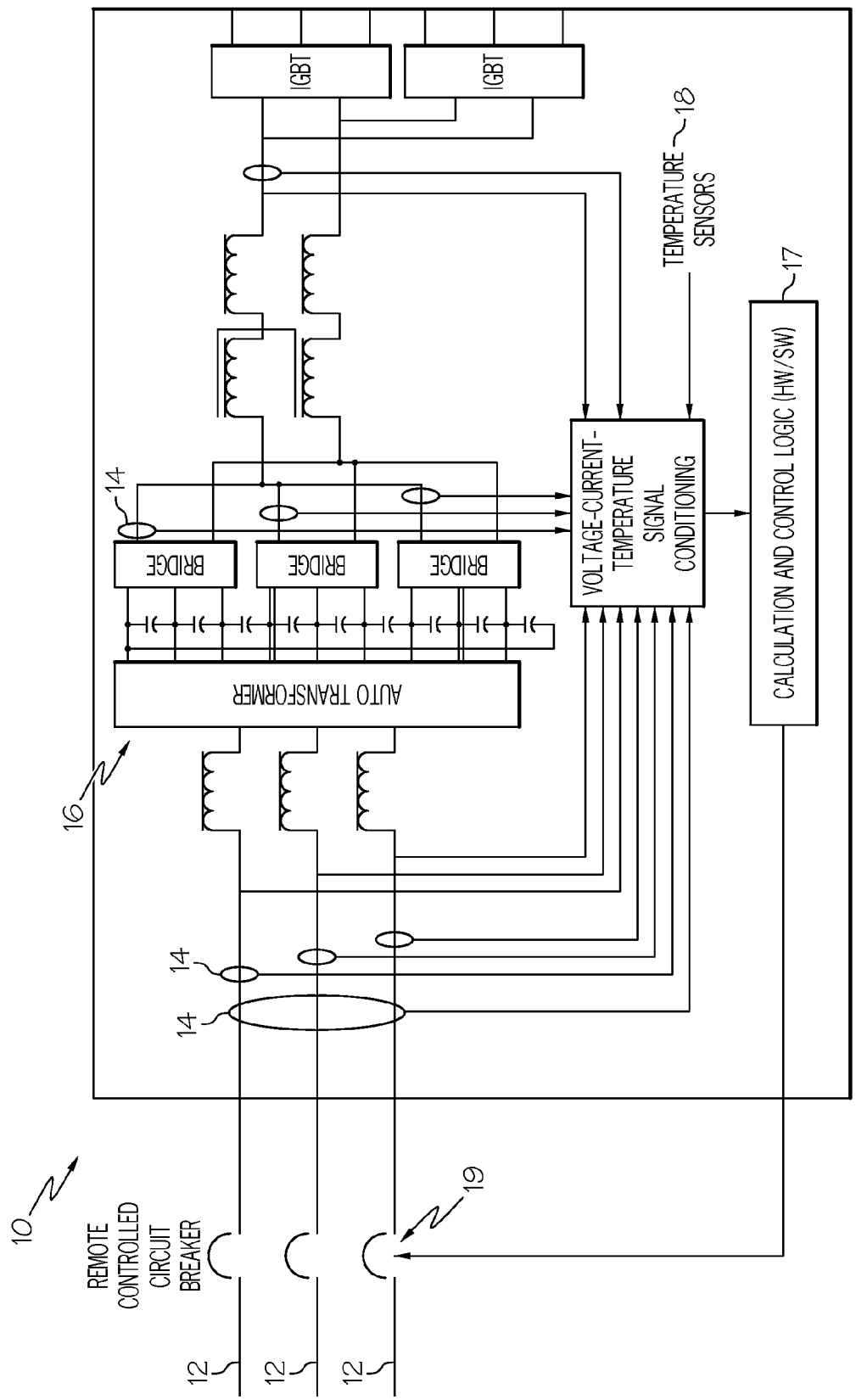
FIG. 1 is block diagram of a power quality protection system according to an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

For power quality understanding, some power quality terminology and definitions are listed below.

Normal operation—system operates as intended;
Electric starting operations include
  Electric start of main propulsion engine; and
  Battery start of APU;
Abnormal operations include
  Power malfunction or failure occurs;
  Power remains within the limits for specified abnormal operation; and
  Power utilization equipment shall not suffer damage and/or cause an unsafe condition;
Power failure—Loss of power shall not result in an unsafe condition or damage utilization equipment;
Emergency operation—Occurs following loss of the main generator;
Point of Regulation (POR)—Power source senses and regulates the system voltage at this location;
Steady state—Power condition that remains within the limits for normal operation;
Transient—Power condition that remains within the limits for normal transient operation;
Over-voltage and under-voltage includes where
  Voltage exceeds transient limits for normal operation; or
  Voltage is limited by action of protective devices;
Over frequency and under frequency for ac systems includes where
  Frequency exceeds transient limits for normal operation; or
  Frequency is limited by the action of protective devices;
Frequency modulation (stability)—Frequency variation occurring within 1 min;
Load unbalance—Difference between highest and lowest loads between the lines of three-phase system;
Distortion—rms value of the AC waveform exclusive fundamental or DC;
  Factor—rms/fundamental or rms/DC;
  Spectrum—The AC or DC distortion, all frequencies, amplitudes and phases; and
Ripple—Max absolute value of the difference between the steady state and the instantaneous DC voltage.

Broadly, embodiments of the present invention provide a system and method for power quality protection. The method for power quality protection may include measurement of electrical and nonelectrical parameters, calculation of additional electrical and nonelectrical parameters, comparison of the value of the calculated parameters with maximum allowed values from a power quality perspective, and activation of protection mechanisms for transitioning to a safe mode or for isolation from the bus. The systems and methods of the present invention may prevent equipment failures when out of spec power quality is present in the distribution bus and may protect the distribution bus from imposing power quality problems due to equipment failures. Because most of the sensors in the systems of the present invention are already used for other control and protection purposes, there may be no reliability degradation. Most of the calculations and the control logic may be performed digitally for improved reliability and flexibility to modify algorithms.

The power quality protection algorithm may include measurement of electrical and nonelectrical parameters (data acquisition); calculation of additional electrical and nonelectrical parameters (data processing); comparison of the value of the calculated parameters with maximum allowed values from a power quality perspective (fault detection logic); and activation of a protection mechanism for transitioning to a safe mode or isolation from the bus (fault detection logic and fault isolation logic).

FIG. 1 shows an example block diagram of an electric drive system 10. An input power signal 12 may be, for example, a three-phase AC power signal. Various sensors 14 may be used on the input power signal 12 and power signal output from the power topology components 16. These sensors 14 may detect, for example, AC input voltage, AC input current, impedance, resistance, autotransformer rectifier units (ATRU) output current, DC link voltage, and DC link current. Temperature sensors 18 may be used for measuring temperature of various components. Circuit breakers 19 may be employed on the input power signal 12 to interrupt current in any or all of the legs of the input power signal 12. In some embodiments, the circuit breakers 19 may be remote controlled. A control logic 17 may receive the measured parameters from the sensors 14 and may control the circuit breakers 19.

The simple measurements of currents and voltages may not be able to directly detect some of the power quality attributes. This is particularly valid for high-frequency harmonics. To detect these harmonics, very high resolution measurement with high-speed of acquisition will be required. This may result in a need for high-speed, complex analog electronics and high-speed digital processing that may not be affordable for most of the industry applications. Therefore, indirect measurement of harmonics content (such as component temperature) may be required. It may be predetermined that some component failures will create harmonic noncompliances.

Detecting component failures may give an indication of increased harmonics content and may activate the protection provisions. Certain failures of components may not be easily detectable. Therefore, over-temperature detection may be used as well. Temperature sensors are typically slower compared to current and voltage sensors, which will increase the response time.

Figure 2:
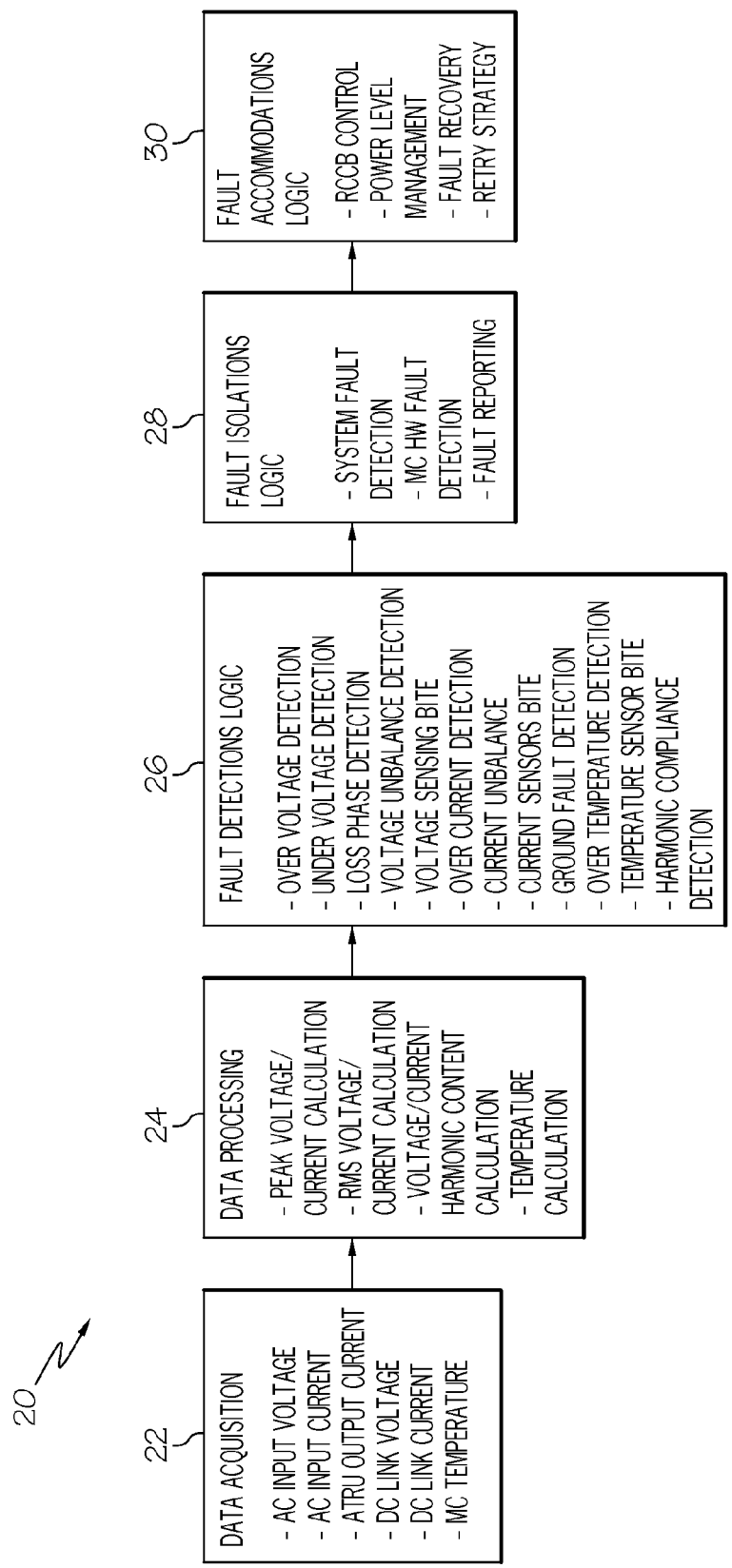
FIG. 2 is flow chart identifying the sequence of events during a method of power quality protection according to an embodiment of the present invention.

FIG. 2 is a flow chart which identifies the sequence of events performed in a power quality protection method 20 according to an embodiment of the present invention. In step 22, data acquisition may take place. This data acquisition may be continuous and may monitor various parameters such as AC input voltage, AC input current, ATRU output current, DC link voltage, DC link current and various temperatures (such as motor controller temperatures). In step 24, data processing may take place. This data processing may include calculating peak voltage and current, calculating RMS voltage and current, calculating voltage and current harmonic content and calculating temperatures (when not directly measured by the data acquisition step). In step 26, fault detection logic may use the measured and processed data to detect one or more of the following faults: over voltage, under voltage, loss of phase, voltage unbalance, voltage sensing bite, over current, current unbalance, current sensors bits, ground fault, over temperature, temperature sensor bite, and harmonic compliance. These faults are described in greater detail in Table 1. In step 28, once a fault is detected in step 26, the fault may be isolated. This step may include detection of a system fault, detection of a hardware fault (such as motor controller hardware), and fault reporting. In step 30, logic may be included to accommodate the fault. This may include residual current circuit breaker (RCCB) control, power level management, fault recovery, and retry strategies.

An example of a power quality detection and protection method for an electrical controller is described below. The power quality protection method for this electrical controller uses 3-phase input voltage measurements, 3-phase input current measurements, one sum of a 3-phase current measurement, a DC bus voltage measurement, and various temperature measurements.

Both the instantaneous and the calculated RMS values of the AC measurements are updated every 100 microseconds and used for the various power quality fault detection algorithms. The DC bus voltage ripple can be included as well. Detection techniques are summarized in Table 1.

TABLE 1

Example of Power Quality Detection and Protection

| | |
|---|---|
| 1. | OVER-VOLTAGE DETECTION: Each input RMS phase voltage is measured, calculated, and compared with the over-voltage limit. This process will be performed continuously. |
| 2. | UNDER-VOLTAGE DETECTION: Each input RMS phase voltage is measured, calculated, and compared with the under-voltage limit. This process will be performed after the remote-controlled circuit breaker (RCCB) is closed. |
| 3. | LOSS OF PHASE DETECTION: The input RMS input current and the dc link ripple will be used to determine loss of phase. For an open input phase, the dc voltage ripple is about 210-V pk-pk, the input current is unbalanced and high, and the ac input voltages show unbalance. Reducing the load to "standby" levels significantly reduces ripple and ac current unbalance. |
| 4. | VOLTAGE UNBALANCE DETECTION: The three RMS phase voltages are compared to determine the voltage unbalance condition. The dc link ripple voltage can also be used for this detection. For a typical unbalanced ac input, simulation results show the following ac input and dc voltage measurement trends: the dc bus voltage ripple is greater than 100-V pk-pk, and the ac input current is unbalanced as much as (80%) between phases. Reducing the load to "standby" levels significantly reduces the dc ripple and ac input current unbalance. |
| 5. | VOLTAGE SENSING BITE: During the RCCB opened state, the input voltage measurement is checked to ensure that voltage sensors operate properly. In the case of offset error, the software can use the data to calibrate the sensors. |
| 6. | OVER-CURRENT DETECTION: The peak value for each input is used to determine the phase over-current. The hardware time delay is used to prevent a false trip due to transformer inrush current. For a shorted rectifier diode, the ac input currents are >800 A. For a dc short, the ac input currents are >800 A with a dc offset. For a shorted secondary winding, the ac input currents are >80 Arms and unbalanced; also, the dc voltage ripple is about 210 V pk-pk. |
| 7. | CURRENT UNBALANCE: The three RMS phase currents are compared to determine the current unbalance condition. The dc link ripple is also high during this condition. For an open rectifier diode, the dc voltage ripple is about 90 V pk-pk. Some ac input current unbalance is caused. Reducing the load to "standby" levels significantly reduces the dc ripple and ac current unbalance. For an open secondary winding, the dc voltage ripple is about 110 V pk-pk. Some ac input current unbalance is caused. |
| 8. | CURRENT SENSOR BITE: During the RCCB opened state, the input current measurements are checked to ensure that the voltage sensors work properly. In the case of an offset error, the software can use the data to calibrate the sensors. |
| 9. | GROUND FAULT DETECTION: The instantaneous sum of these input phase currents is measured to detect a ground fault. A hardware time delay is used to prevent a false trip due to the ground-plane fluctuation test. |
| 10. | OVER-TEMPERATURE DETECTION: The temperature measurement can be used to detect excessive power loss in the controller due to a failure condition. |
| 11. | TEMPERATURE SENSOR BITE: Both high and low temperature signals are checked to detect a short circuit or open circuit for the sensor and the wiring. |

The methods and systems for power quality protection may yield several advantages over conventional systems. (1) Self Protection. The systems and methods may prevent equipment failures when out-of-specification power quality is present in the distribution bus. (2) System Protection. The systems and methods may protect the distribution bus from exhibiting power quality problems due to equipment failures. (3) Most of the sensors in the electrical equipment are already used for other control and protection purposes. Therefore, there is no reliability degradation. Most of the electrical equipment calculations and the control are performed digitally for flexibility to modify algorithms and improve reliability.

It should be understood, of course, that the foregoing relates to exemplary embodiments of the invention and that modifications may be made without departing from the spirit and scope of the invention as set forth in the following claims.

We claim:

1. A power quality protection system comprising:
an input for an AC power signal;
circuit breakers on each leg of the AC power signal;
power topology components for converting the input AC power signal into power output signals;

a plurality of sensors configured to measure electrical and non-electrical parameters from the power output signals; and a control logic module configured to control and process logic programmed with code, the control logic module configured to:

calculate additional electrical and non-electrical parameters corresponding to the power output signals, compare the values of the calculated parameters with maximum allowable values, detect the presence of harmonic non-compliance in the system based on the comparison, and activate a protection mechanism in response to the detection of harmonic non-compliance.

2. The power quality protection system of claim 1, wherein the circuit breakers are remote controlled circuit breakers controlled by the control and processing logic.

3. The power quality protection system of claim 1, wherein the measured electrical and non-electrical parameters include AC input voltage, AC input current, autotransformer rectifier unit output current, DC link voltage, DC link current and component temperature.

4. The power quality protection system of claim 3, wherein the component temperature is motor controller temperature.

5. The power quality protection system of claim 1, wherein the calculated additional parameters include peak voltage, peak current, RMS voltage, RMS current, voltage harmonic content, current harmonic content and temperature.

6. The power quality protection system of claim 1, further comprising fault detection logic.

7. The power quality protection system of claim 6, wherein the fault detection logic is adapted to detect at least one of over voltage, under voltage, loss of phase, voltage unbalance, voltage sensing bite, over current, current unbalance, current sensors bite, ground fault, over temperature, temperature sensor bits, and harmonic compliance.

8. The power quality protection system of claim 1, further comprising fault isolation logic adapted to detect a system fault, detect a hardware fault, and report a detected fault.

9. The power quality protection system of claim 1, wherein the protection mechanism performs either transitioning the system into a safe mode or isolating the system from a power bus.

10. The power quality protection system of claim 1, wherein the protection mechanism is adapted to control the circuit breakers, manage power levels, or recover from a fault.

11. A power quality protection method comprising:

measuring electrical and non-electrical parameters of an electric drive system;

calculating additional electrical and non-electrical parameters of the drive system based on the measured electrical and non-electrical parameters;

comparing values of the calculated parameters with maximum allowed values for harmonic distortion in the electric drive system; and activating a protection mechanism for transitioning the electric drive system to a safe mode for isolation of the electric drive system from a power bus in response to the calculated parameters exceeding the maximum allowed values for harmonic distortion.

12. The power quality protection method of claim 11, wherein the measured electrical and non-electrical parameters include AC input voltage, AC input current, autotransformer rectifier unit output current, DC link voltage, DC link current and component temperature.

13. The power quality protection method of claim 12, wherein the component temperature is motor controller temperature.

14. The power quality protection method of claim 13, wherein the calculated parameters include peak voltage, peak current, RMS voltage, RMS current, voltage harmonic content, current harmonic content and temperature.

15. The power quality protection method of claim 11, further comprising detecting at least one of over voltage, under voltage, loss of phase, voltage unbalance, voltage sensing bite, over current, current unbalance, current sensors bite, ground fault, over temperature, temperature sensor bits, and harmonic compliance.

16. The power quality protection method of claim 11, further comprising closing a circuit breaker to isolate the electric drive system.

17. The power quality protection method of claim 11, including indirectly measuring high-frequency harmonics.

18. A digital processor-readable medium containing programmable code for implementing a method, the method comprising:

sensing electrical and non-electrical parameters of an electric drive system;

calculating additional electrical and non-electrical parameters based on the sensed electrical and non-electrical parameters;

comparing the values of the calculated parameters with maximum allowed values for harmonic distortion in the electric drive system; and activating a protection mechanism for transitioning the electric drive system to a safe mode or for isolation of the electric drive system from a power bus, wherein at least one of the calculated parameters includes a measurement for high-frequency harmonics.

19. The method of claim 18, further comprising detecting at least one of over voltage, under voltage, loss of phase, voltage unbalance, voltage sensing bite, over current, current unbalance, current sensors bite, ground fault, over temperature, temperature sensor bits, and harmonic compliance.

20. The method of claim 18, wherein the measured electrical and non-electrical parameters include AC input voltage, AC input current, autotransformer rectifier unit output current, DC link voltage, DC link current and component temperature.

* * * * *